United States Patent [19]

van der Schoot

[11] Patent Number: 5,000,205
[45] Date of Patent: Mar. 19, 1991

[54] METHOD OF PRE-WASHING AND AFTER-WASHING TUBEROUS PRODUCTS OF PEELING THEREOF AND AN APPARATUS FOR PERFORMING THE METHOD

[76] Inventor: Peter W. C. van der Schoot, Liesveld 3, 2964 AG Groot-Ammers, Netherlands

[21] Appl. No.: 425,517

[22] Filed: Oct. 12, 1989

Related U.S. Application Data

[63] Continuation of Ser. No. 205,021, Jun. 3, 1988, abandoned, which is a continuation-in-part of Ser. No. 5,169, Jan. 20, 1987, abandoned.

[30] Foreign Application Priority Data

Jan. 27, 1986 [NL] Netherlands ............... 8600173

[51] Int. Cl.⁵ ........................... B08B 1/02
[52] U.S. Cl. ..................... 134/25.3; 99/625; 99/626; 134/25.1
[58] Field of Search .......... 134/25.1, 25.3, 25.4; 15/311, 317, 318, 316, 378; 99/626, 625

[56] References Cited

U.S. PATENT DOCUMENTS 1,973,917  9/1934  Thompson ............... 134/25.3

FOREIGN PATENT DOCUMENTS 0021358  4/1896  Fed. Rep. of Germany.
2541091  8/1984  France ............... 134/25.3

Primary Examiner—Asok Pal

[57] ABSTRACT

In a method and apparatus for washing or peeling tuberous products including providing a bed of rotatable driven brushes in a container, supplying liquid into the container such that the undersides of the brushes extend into the liquid, disposing the tuberous products onto the brushes at one end of the bed and rotating the brushes to transport the tuberous products to the other end of the bed while cleaning the tuberous products, the improvement comprising contacting the tuberous products above the bed and along the length of the bed to slow down the transport speed of the tuberous products without decreasing the rotational speed of the brushes. The step of contacting comprises providing a plurality of freely pivotable flaps, brushes, grinding rolls, a brush plate or the like above the brushes with the lower ends thereof spaced apart from the tops of the brushes.

37 Claims, 2 Drawing Sheets

METHOD OF PRE-WASHING AND AFTER-WASHING TUBEROUS PRODUCTS OF PEELING THEREOF AND AN APPARATUS FOR PERFORMING THE METHOD

This application is a continuation of application Ser. No. 205,021, filed Jun. 3, 1988, which is a continuation of Ser. No. 005,169, filed Jan. 20, 1987, now both abandoned.

BACKGROUND OF THE INVENTION

The present invention relates to a method of washing or peeling tuberous products including providing a bed of rotatable driven brushes in a container, supplying liquid into the container such that the undersides of the brushes extend into the liquid, disposing the tuberous products onto the brushes at one end of the bed and rotating the brushes to transport the tuberous products to the other end of the bed while cleaning the tuberous products.

In a similar method disclosed in the over 100 year old German patent No. 21.358, the brushes are rotated relatively slowly and the tuberous products are transported by means of beaters disposed above the brushes. Washing takes place in this known method substantially by means of the brushes, while said beaters certainly do not handle the products gently.

SUMMARY OF THE INVENTION

It is an object of the present invention to improve this known method and apparatus.

To this effect, the method according to the present invention is characterized by comprising contacting the tuberous products above the bed and along the length of the bed to slow down the transport speed of the tuberous products without decreasing the rotational speed of the brushes.

The step of contacting comprises providing a plurality of freely pivotable flaps, brushes, grinding rolls, a static brush plate or the like above the brushes with the lower ends thereof spaced apart from the tops of the brushes. By using a brush plate and/or grinding rolls on the upper- or underside of the product path it is also possible to peel tuberous products.

The present invention also relates to an apparatus for washing tuberous products having a container, a brush bed in the container including a plurality of rotatably driven brushes, means for supplying liquid to the container to dispose liquid at the underside of the brushes and means for inputting tuberous products at one end of the bed and for discharging cleaned tuberous products at the other end of the bed which have been transported in response to the rotation of the brushes, said apparatus being characterized by means disposed above the bed and spaced therefrom for contacting the tuberous products on the bed to slow down the transport speed of the tuberous products without decreasing the rotational speed of the brushes.

The apparatus according to the invention is further characterized in that the contacting means comprises a plurality of flaps, grinding rolls rotatably mounted on a top end or a static brush plate, with the lower end thereof spaced apart from the tops of the brushes.

The lower end of the flaps, brushes, grinding rolls or the static brush plate can be adjustable in relation to the said first brushes: in this way an adaptation to the diameter of the tuberous products is possible.

In a further elaboration of the invention the means for supplying liquid comprises means for spraying fresh liquid from above the brushes at the other end of the bed.

When the container is downwardly tapering and is provided at its bottom with a valve by means of which the dirt accumulated at the bottom of the tapering container can be discharged, a supply device for clean liquid, such as water, can be arranged near the discharge end of the brush conveyor so that any dirt present on the products to be discharged can be removed therefrom in a simple manner, e.g. foam, which is produced as a result of the starch formed when use is made of the apparatus as an after-washer for e.g. steamed potatoes.

A number of vertical partitions may be arranged in the container, so that the turbulence is minimized and a good settlement is obtained.

The container may have an overflow in a known manner.

The brushes can be driven in a known manner by a motor, viz. by means of a reduction gearbox and a mutual transmission including one of chains, a geared belt transmission or a geared transmission for driving the brushes, means for adjusting the rotational speed of the brushes to sling the water off the brushes against the tuberous products while the tuberous products fall back on the brushes. The rotation speed of the brushes may be adjustable in such a manner that the water on the one hand is properly slung off the brushes against the tuberous products being treated, but the tuberous products on the other hand fall back on the brushes.

A detailed description of the brushes and their arrangement on a bed is given in Applicants' U.S. Pat. No. 4,242,952, describing a brush conveyor a great many parts washer according to the present invention.

For the sake of completion, it is pointed out that there is also known a pre-washing and after-washing apparatus, comprising a rotating cage consisting of a cylinder whose wall is perforated or consists of bars. Centrally disposed in the cage is a sprayer pipe having a plurality of nozzles. Such an apparatus, however, is not effective, anymore than that disclosed in the above German patent, when used as a pre-washer for removing clay and the like from a tuberous product or when used as an after-washer for removing a slimy starch layer from the steamed product.

The known apparatus has the drawback that comparatively much spraying water is needed for removing clay or the like, when used as a pre-washer, or starch, when used as an after-washer.

In the past, it has been tried to reduce the water consumption by recycling the water, but these efforts have all failed as a result of the clogging of the nozzles.

Another major drawback of the known apparatus is that spraying takes place in one or a few points only.

Two embodiments of the pre-washer and after-washer or a peeling apparatus according to the present invention will now be described, by way of example, with reference to the accompanying drawings, in which:

DETAILED DESCRIPTION OF THE INVENTION

Figure 1:
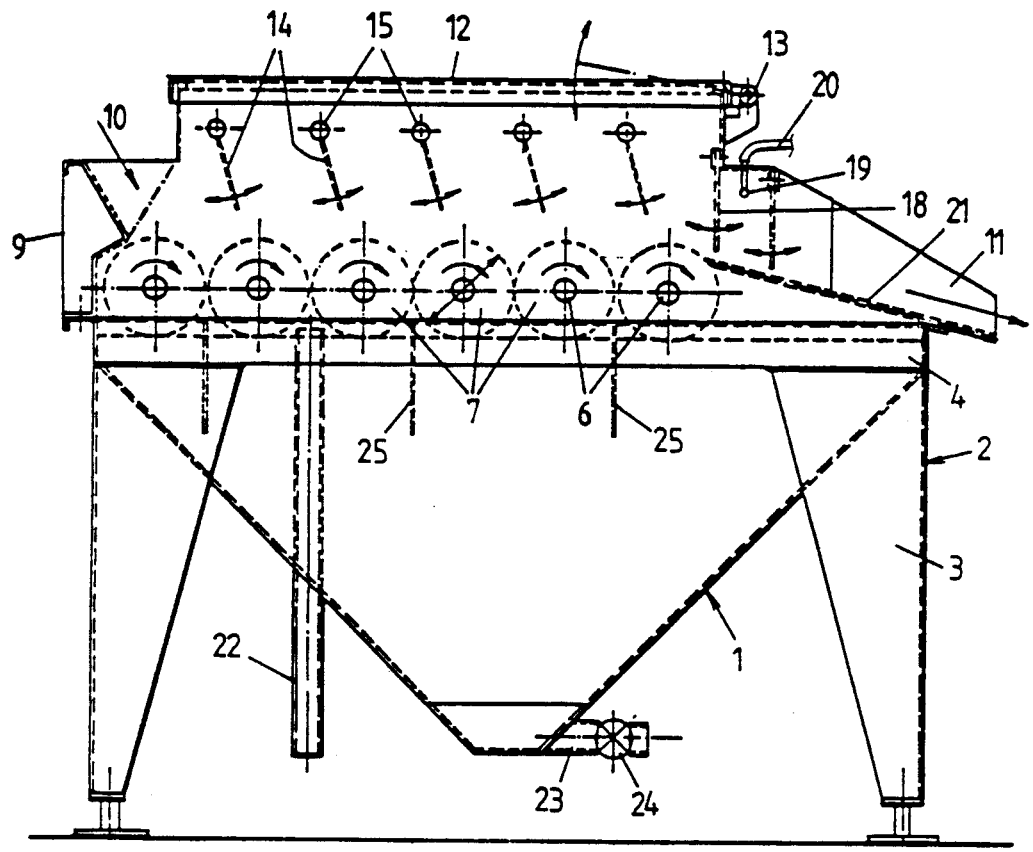
FIG. 1 is a diagrammatic side view of a pre-washer and after-washer.
Figure 2:
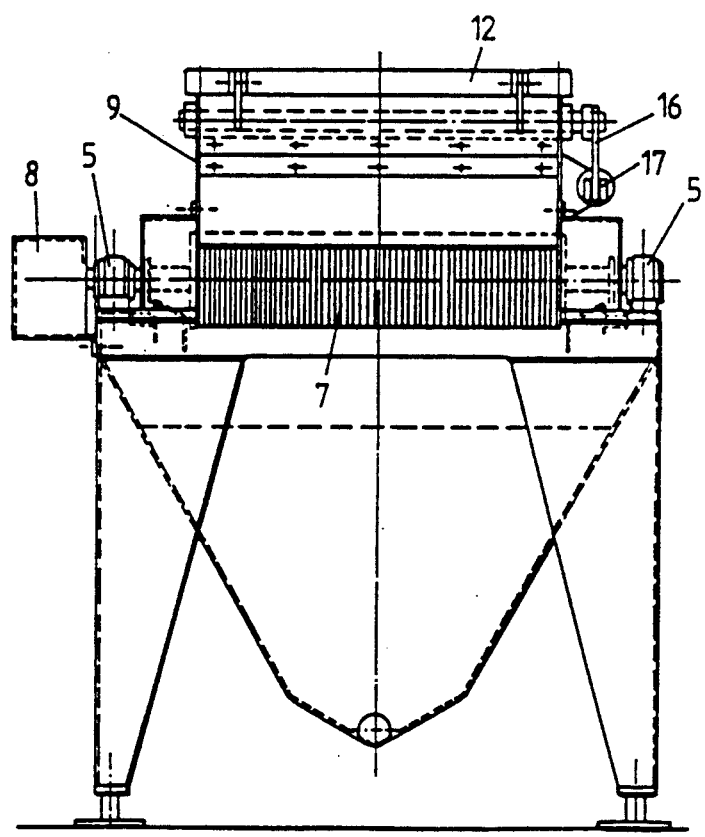
FIG. 2 is a diagrammatic side view of the apparatus shown in FIG. 1.

As shown in the drawings, a pre-washing and after-washing apparatus for tuberous products, such as potatoes, comprises a funnel-shaped container 1 received in a frame 2, basically consisting of four adjustable legs 3 and a window-shaped upper frame 4, on which are arranged a plurality of brushes 7 mounted on shafts 6 by means of bearings 5. The brushes are driven by a motor and reduction gearbox, not shown, driving the tandem-disposed shafts 6 by means of a chain casing 8. As shown in the drawing, the container with the window-shaped frame 4 is provided at the top with an upper portion 9 having in FIG. 1, as viewed on the left, a supply opening 10 and on the opposite side a discharge opening 11.

The upper portion 9 is shut off at its top by a cover 12 connected rotatably to the upper portion 9 by means of a pivot 13. Rubber flaps or slabs 14 arranged in the top of the upper portion 9 are accessible via an opened cover 12. The flaps or slabs 14 are each attached to a shaft 15 and are provided outwardly of said upper portion 9 with a lever 16. The bottoms of the levers are connected rotatably to rods 17 one end of which is connected to an adjustment mechanism, not shown, since this may be both a hand-operated mechanism and a servo-operated mechanism, or a mechanism operated differently.

As further shown in the drawings, the upper portion 9 adjacent the discharge end 11 is provided with two rubber slabs 18 connected fixedly to the upper portion. Between said slabs 18 are arranged one or more sprinklers 19 having a supply pipe 20 for the supply of fresh water. By arranging the supply device at this location, the treated tuberous products are washed clean just before leaving the apparatus via the barred plate 21.

As shown in FIG. 1, container 1 is provided with an overflow tube 22, allowing to maintain a given water level in a simple manner. Besides, the bottom of container 1 is provided with a discharge pipe 23 wherein a valve 24 is disposed for discharging the settled dirt. In order to ensure a good proceeding of the settlement of the dirt removed from the products, there are arranged a plurality of vertical baffles 25 at the top in container 1, said baffles braking the turbulence of the water produced by the rotating brushes 7 (the direction of rotation thereof is indicated by an arrow).

Figure 3:
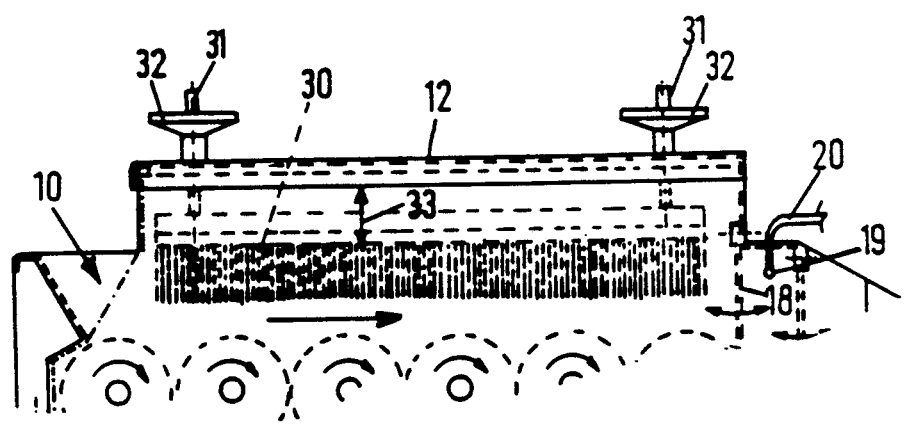
FIG. 3 is a diagrammatic view according to FIG. 1 of a part of a peeling apparatus.

In the second embodiment shown in FIG. 3, substantially corresponding to the embodiment shown in FIG. 1, the same parts have identical reference numerals. The differences consist in that instead of the rubber flaps or slabs 14, use is made of a brush plate 30 adjustable vertically relatively to the cover 12 by means of lead screws and nuts 31 and 32, respectively.

This vertical adjustability is represented by a double arrow 33. By using a brush plate with comparatively harder or tougher hair, "peeling" can be effected excellently with the apparatus according to the invention: as compared with known peeling apparatus, moreover, the advantage is obtained that also "deeper" portions of the product to be treated are peeled. Instead of a brush plate, use can also be made of one or more grinding discs, rotary brushes or the like.

It will be clear that a great many alterations are possible with regard to structural details, without departing from the scope of the present invention. For instance, instead of a chain transmission, also a geared transmission or a geared belt transmission may be employed.

What I claim is:

1. A method of washing or peeling tuberous products comprising: providing a bed of rotatably driven elements in a container and wherein the elements define a top surface of the bed, supplying liquid into the container to only partially submerge the elements so that only the undersides of the elements extend into the liquid, disposing the tuberous products on the top surface of the bed at one end of the bed; transporting the tuberous products from the one end of the bed to another end of the bed solely by rotating the elements; and washing or peeling the tuberous products by adjusting the rotational speed of the elements to sling liquid off the elements against the tuberous products and by slowing down the transport speed of the tuberous products from said one end of the bed to said another end thereof without decreasing the rotational speed of the elements solely by contacting the tuberous products along the length of the bed with generally downwardly extending flaps disposed entirely above the top surface of the bed and having lowermost ends spaced above the top surface of the bed.

2. The method according to claim 1, wherein the flaps are rubber.

3. The method according to claim 1, wherein the flaps are freely pivotable at upper ends thereof.

4. The method according to claim 1, wherein the step of supplying liquid comprises recirculating dirty liquid into the container and spraying fresh liquid onto the tuberous products at the other end of the bed.

5. The method according to claim 1, wherein the elements comprise brushes.

6. The method according to claim 1, wherein the elements comprise grinding rolls.

7. A method of washing or peeling tuberous products comprising: providing a bed of rotatably driven elements in a container and wherein the elements define a top surface of the bed, supplying liquid into the container to only partially submerge the elements so that only the undersides of the elements extend into the liquid, disposing the tuberous products on the top surface of the bed at one end of the bed; transporting the tuberous products from the one end of the bed to another end of the bed solely by rotating the elements; and washing or peeling the tuberous products by adjusting the rotational speed of the elements to sling liquid off the elements against the tuberous products and by slowing down the transport speed of the tuberous products from said one end of the bed to said another end thereof without decreasing the rotational speed of the elements solely by contacting the tuberous products along the length of the bed with generally downwardly extending brushes along the length of the bed and disposed entirely above the top surface of the bed and having lowermost ends spaced above the top surface of the bed.

8. The method according to claim 7, wherein the brushes are stationary.

9. The method according to claim 7, wherein the step of supplying liquid comprises recirculatory dirty liquid into the container and spraying fresh liquid onto the tuberous products at the other end of the bed.

10. The method according to claim 7, wherein the elements comprise brushes.

11. The method according to claim 7, wherein the elements comprise grinding rolls.

12. A method of washing or peeling tuberous products comprising: providing a bed of rotatably driven elements in a container and wherein the elements define a top surface of the bed, supplying liquid into the container to only partially submerge the elements so that only the undersides of the elements extend into the liquid, disposing the tuberous products on the top surface of the bed at one end of the bed; transporting the tuberous products from the one end of the bed to another end of the bed solely by rotating the elements; and washing or peeling the tuberous products by adjusting the rotational speed of the elements to sling liquid off the elements against the tuberous products and by slowing down the transport speed of the tuberous products from said one end of the bed to said another end thereof without decreasing the rotational speed of the elements solely by contacting the tuberous products along the length of the bed with grinding rolls disposed entirely above the top surface of the bed and having lowermost ends spaced above the top surface of the bed.

13. The method according to claim 12, wherein the step of supplying liquid comprises recirculating dirty liquid into the container and spraying fresh liquid onto the tuberous products at the other end of the bed.

14. The method according to claim 12, wherein the elements comprise brushes.

15. The method according to claim 12, wherein the elements comprise grinding rolls.

16. An apparatus for washing or peeling tuberous products, said apparatus comprising: a container, a bed in the container including a plurality of rotatably driven elements and wherein the elements define a top surface of the bed; means for supplying liquid to the container below the elements to only partially submerge the elements such that only the underside of the elements extend into the liquid; means for inputting tuberous products onto the top surface of the bed at one end of the bed; means for discharging cleaned tuberous products at another end of the bed; means for transporting the tuberous products from said one end of the bed to said another end of the bed solely comprising the rotation of the elements; and means for washing or peeling the tuberous products comprising means for adjusting the rotational speed of the elements to sling liquid off the elements against the tuberous products and means for slowing down the transport speed of the tuberous products without decreasing said rotational speed of the elements solely comprising generally downwardly extending flaps for contacting the tuberous products and mounted along the length of the bed entirely above the top surface of the bed and with lowermost ends spaced above the top surface of the bed.

17. The apparatus according to claim 16, wherein the flaps are rubber.

18. The apparatus according to claim 16, wherein each flap is freely pivotably mounted at an upper end thereof.

19. The apparatus according to claim 16, wherein contacting means further comprises means for adjusting the spacing of the lowermost end of the flaps from the top surface of the bed.

20. The apparatus according to claim 16, wherein the means for supplying liquid comprises means for spraying fresh liquid from above the bed of brushes at said another end of the bed.

21. The apparatus according to claim 16, wherein the container has a plurality of vertical baffles.

22. The apparatus according to claim 16, wherein the means for adjusting comprises a reduction gearbox and a transmission.

23. The apparatus according to claim 16, wherein the elements comprise brushes.

24. The apparatus according to claim 16, wherein the elements comprise grinding rolls.

25. An apparatus for washing or peeling tuberous products, said apparatus comprising: a container; a bed in the container including a plurality of rotatably driven elements and wherein the elements define a top surface or the bed; means for supplying liquid to the container below the elements to only partially submerge the elements such that only the underside of the elements extend into the liquid; means for inputting tuberous products onto the top surface of the bed at one end of the bed; means for discharging cleaned tuberous products at another end of the bed; means for transporting the tuberous products from said one end of the bed to said another end of the bed solely comprising the rotation of the elements; and means for washing or peeling the tuberous products comprising means for adjusting the rotational speed of the elements to sling liquid off the elements against the tuberous products and means for slowing down the transport speed of the tuberous products without decreasing said rotational speed of the elements solely comprising generally downwardly extending brushes for contacting the tuberous products and mounted along the length of the bed entirely above the top surface of the bed and with lowermost ends spaced above the top surface of the bed.

26. The apparatus according to claim 25, wherein the brushes are stationary during the transport.

27. The apparatus according to claim 25, wherein the means for supplying liquid comprises means for spraying fresh liquid from above the brushes at said another end of the bed.

28. The apparatus according to claim 25, wherein the container has a plurality of vertical baffles.

29. The apparatus according to claim 25, wherein the means for adjusting comprises a reduction gearbox and a transmission.

30. The apparatus according to claim 25, wherein the elements comprise brushes.

31. The apparatus according to claim 25, wherein the elements comprise grinding rolls.

32. An apparatus for washing or peeling tuberous products, said apparatus comprising: a container; a bed in the container including a plurality of rotatably driven elements and wherein the elements define a top surface of the bed; means for supplying liquid to the container below the elements to only partially submerge the elements such that only the underside of the elements extend into the liquid; means for inputting tuberous products onto the top surface of the bed at one end of the bed; means for discharging cleaned tuberous products at another end of the bed; means for transporting the tuberous products from said one end of the bed to said another end of the bed solely comprising the rotation of the elements; and means for washing or peeling the tuberous products comprising means for adjusting the rotational speed of the elements to sling liquid off the elements against the tuberous products and means for slowing down the transport speed of the tuberous products without decreasing said rotational speed of the elements solely comprising grinding rolls for contacting the tuberous products and mounted along the length of the bed entirely above the top surface of the bed and with lowermost ends spaced above the top surface of the bed.

33. The apparatus according to claim 32, wherein the means for supplying liquid comprises means for spraying fresh liquid from above the brushes at said another end of the bed.

34. The apparatus according to claim 32, wherein the container has a plurality of vertical baffles.

35. The apparatus according to claim 32, wherein the means for adjusting comprises a reduction gearbox and a transmission.

36. The apparatus according to claim 32, wherein the elements comprise brushes.

37. The apparatus according to claim 32, wherein the elements comprise grinding rolls.

* * * * *